United States Patent [19]

Boggs et al.

[11] Patent Number: 5,233,948
[45] Date of Patent: Aug. 10, 1993

[54] VARIABLE CYCLE ENGINE

[75] Inventors: David L. Boggs, West Bloomfield; Michael M. Schechter, Farmington Hills, both of Mich.

[73] Assignee: Ford Motor Company, Dearborn, Mich.

[21] Appl. No.: 988,495

[22] Filed: Dec. 10, 1992

[51] Int. Cl.⁵ ............................................. F01L 9/02
[52] U.S. Cl. ................................. 123/64; 123/90.15; 123/90.16; 123/90.17; 123/432
[58] Field of Search ............. 123/21, 64, 90.15, 90.16, 123/90.17, 90.31, 432, 78 R, 78 B, 48 R, 48 B

[56] References Cited

U.S. PATENT DOCUMENTS

| | | | |
|---|---|---|---|
| 3,667,433 | 6/1972 | Isley | 123/78 B |
| 3,714,932 | 2/1973 | Meacham et al. | 123/90.15 |
| 3,938,483 | 2/1976 | Firey | 123/90.16 |
| 3,978,829 | 9/1976 | Takahashi et al. | 123/90.15 |
| 3,995,606 | 12/1976 | Firey | 123/90.16 |
| 4,009,694 | 3/1977 | Firey | 123/90.16 |
| 4,033,304 | 7/1977 | Luria | 123/90.16 |
| 4,084,557 | 4/1978 | Luria | 123/90.16 |
| 4,138,973 | 2/1979 | Luria | 123/90.16 |
| 4,552,112 | 11/1985 | Nagao et al. | 123/432 |
| 4,700,684 | 10/1987 | Pischinger et al. | 123/568 |
| 4,869,214 | 9/1989 | Inoue et al. | 123/90.17 |
| 4,917,058 | 4/1990 | Nelson et al. | 123/90.17 |
| 4,974,560 | 12/1990 | King | 123/90.17 |
| 4,979,427 | 12/1990 | Pfeffer et al. | 123/48 B |
| 4,993,370 | 2/1991 | Hashiyama et al. | 123/90.17 |
| 5,027,753 | 7/1991 | Hamazaki et al. | 123/90.15 |
| 5,031,582 | 7/1991 | Kruger | 123/90.15 |

OTHER PUBLICATIONS

SAE Technical Paper Series 890677, Saunders et al, "Variable Value Closure Timing for Load Control and the Otto Atkinson Cycle Engine", Feb. 27–Mar. 3, 1989.

Primary Examiner—Willis R. Wolfe
Assistant Examiner—M. Macy
Attorney, Agent, or Firm—Jerome R. Drouillard; Roger L. May

[57] ABSTRACT

A method of phaseshifting a variable cycle engine utilizing the Otto cycle engine timing schedule for full-load and the Atkinson cycle engine timing schedule for part-load operation, the engine having multiple intake valves and an exhaust valve, phaseshifting of the intake and exhaust events coupled with adjustment of the clearance volume and the use of residual gas in the cylinder as a determinant of the intake charge volume and the compression end temperature level, to provide a high engine operating efficiency while concurrently lowering nitrogen oxide emissions and eliminating the need for an external exhaust gas recirculating system.

15 Claims, 4 Drawing Sheets

FULL LOAD $r_{ca} = r_{ea} = V_{1a}/V_{2a}$ $r_c$ = COMPRESSION RATIO
$r_e$ = EXPANSION RATIO

FIG. 2A

PART LOAD $r_{cb} = V'_{1b}/V_{2b} = r_{ca}$ $r_{eb} = V_{1b}/V_{2b} > r_{ea}$

FIG. 2B

FIG.3A — HEAVY LOAD TDC

FIG.3B — MEDIUM LOAD TDC
PRIMARY INTAKE – NO PHASE SHIFT, SECONDARY INTAKE – 35° SHIFT, EXHAUST – 35° SHIFT

FIG.3C — LIGHT LOAD TDC
PRIMARY INTAKE – NO PHASE SHIFT
SECONDARY INTAKE – 75° SHIFT
EXHAUST – 35° SHIFT

FIG.3D — IDLE TDC
PRIMARY INTAKE – NO PHASE SHIFT
SECONDARY INTAKE – 40° SHIFT
EXHAUST – NO PHASE SHIFT

HEAVY LOAD
NO PHASE SHIFT
FIG.5A

MEDIUM LOAD
PRIMARY INTAKE-35° SHIFT
SECONDARY INTAKE-35° SHIFT
EXHAUST-35° SHIFT
FIG.5B

LIGHT LOAD
PRIMARY INTAKE-35° SHIFT
SECONDARY INTAKE-35° SHIFT
EXHAUST-35° SHIFT
FIG.5C

IDLE
PRIMARY INTAKE-NO PHASE SHIFT
SECONDARY INTAKE-40° SHIFT
EXHAUST-NO PHASE SHIFT
FIG.5D

VARIABLE CYCLE ENGINE

This invention relates in general to an automotive type engine and to a method of phaseshifting the engine timing events to achieve high engine operating efficiency. More particularly, it relates to a variable cycle engine that operates on the Otto cycle for full load operation and on the phaseshifting Atkinson cycle for partial loads.

BACKGROUND OF THE INVENTION

Automobile engines operate at light loads most of the time. It is, therefore, imperative to achieve high fuel efficiency of the engine at light loads if good average fuel economy of the automobile is to be assured. Unfortunately, the light load fuel efficiency of a spark ignition type engine is low. One reason for this is due to high pumping losses that occur in an engine in which the air flow is controlled by throttling. Another reason is that the engine size is usually larger than needed for light load operation in order to assure adequate engine torque for good vehicle accelerations. A further reason is that engine knock considerations force the engine designer to set the compression ratio at a relatively low value. This adversely affects the cycle efficiency since efficiency is largely a function of engine compression ratio, which is approximately equal to the expansion ratio in a conventional engine. A still further reason is that at light load, friction consumes a much larger fraction of the indicated work than is the case at heavy load, and even more so due to the fact that the engine is much larger than needed for light load operation.

An engine that minimizes the above disadvantages is a variable cycle engine running on the Otto engine timing cycle at full load, when the compression ratio is approximately equal to the expansion ratio, and on the Atkinson cycle during partial loads, when the expansion ratio and, therefore, the engine efficiency, is increasing with a decrease in the load.

The latter engine operates on a fixed valve event timing schedule at full load for power; and operates at part loads with phaseshifting of the intake and exhaust events and varying the combustion chamber clearance volume to maintain a desired effective compression ratio. Phaseshifting the intake and exhaust events also varies the amount of residual gas left in the cylinder and the intake charge volume that is trapped without throttling of the air flow, thereby eliminating pumping losses.

Figure 1A:
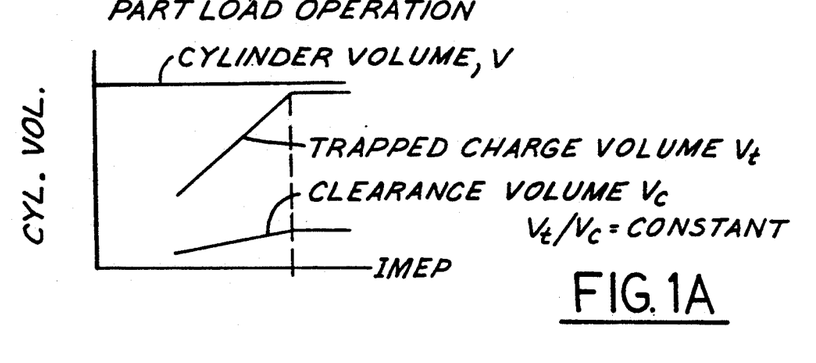
FIGS. 1A and 1B are graphs plotting the change in cylinder volume versus engine load, FIG. 1A comparing trapped charge volume changes to the changes in clearance volume, FIG. 1B showing the changes to expansion and compression ratios.
Figure 1B:
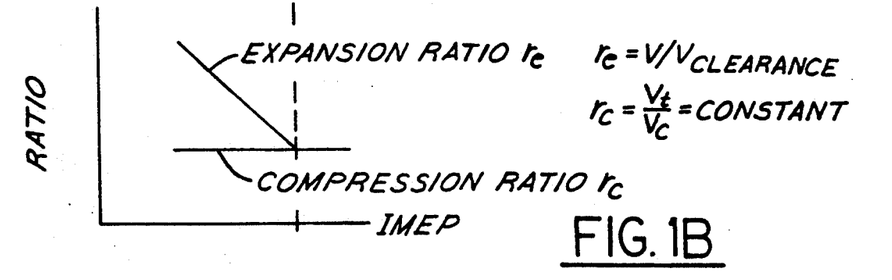

An example of an engine operating under the Otto and Atkinson cycles in which the compression ratio is maintained effectively constant while the expansion ratio increases is illustrated in FIG. 1A. This figure shows some of the engine operating parameters as functions of the engine load expressed as the indicated mean effective pressure (IMEP). The figure shows that during part-load operation, both the volume of intake charge trapped in the cylinder and the clearance volume between the piston and the top of the combustion chamber vary with engine load so that the ratio of the two variable volumes remains constant. This is illustrated in FIG. 1B which also shows that the expansion ratio increases with decrease in IMEP.

Since efficiency varies with the change in expansion ratio, an increase in expansion ratio increases the engine efficiency during part loads and, therefore, is very desirable. Such a mode of operation as described can achieve significant improvement in part-load fuel efficiency in comparison to what can be achieved with conventional modes or methods of engine control. For a spark ignition variable cycle engine, the improvement is due to two factors: eliminating the pumping loop work associated with throttling, and the improved thermodynamic cycle efficiency associated with the increased expansion ratio, as mentioned above.

Figure 2A:
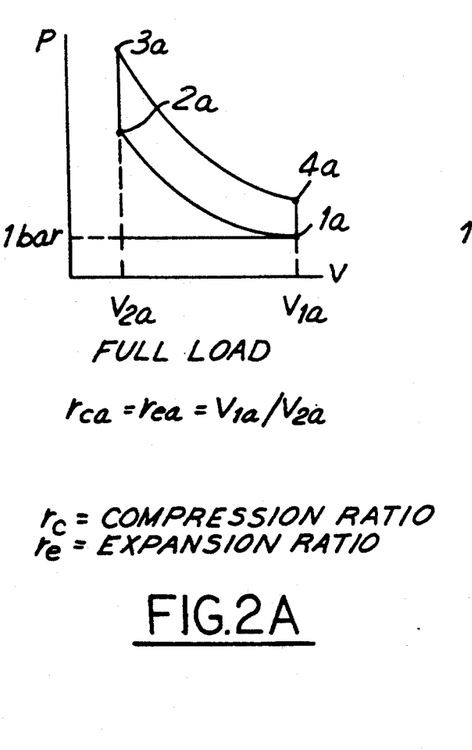
FIGS. 2A and 2B are graphs plotting the changes in cylinder pressure versus cylinder volume, FIG. 2A illustrating operation under the full-load, Otto cycle, FIG. 2B illustrating operation at part-load under the Atkinson cycle.
Figure 2B:
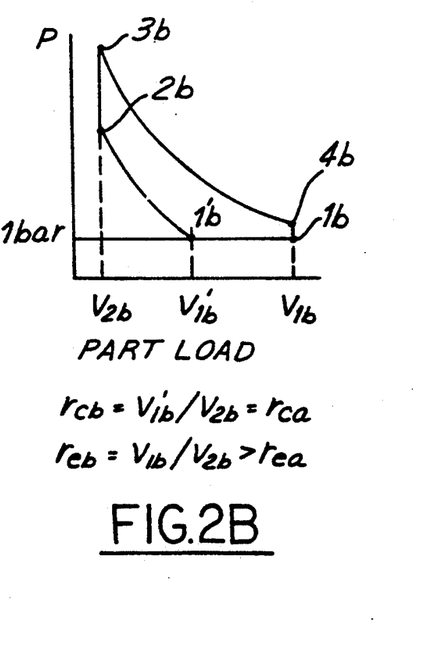

FIGS. 2A and 2B illustrate the above concept, showing ideal pressure-volume (P-V) diagrams for full-load and part-load operations at equal air-to-fuel ratios. At full-load, a trapped volume of intake charge is equal to cylinder volume $V_{1a}$ and the cylinder clearance volume is $V_{2a}$. The expansion ratio is approximately equal to the compression ratio. This type of cycle is referred to as the "Otto cycle."

FIG. 2B shows diagramatically the operation under the Atkinson cycle. At part-load, the beginning of compression is delayed, and the trapped volume is reduced to $V'_{1b}$. At the same time, the clearance volume is reduced to $V_{2b}$, so that the compression ratio remains essentially equal to what it was at the full load Otto cycle operation. The expansion ratio, however, is much larger than it was at the full load of FIG. 2A. It will be seen that the smaller the engine load, the larger the increase in expansion ratio; that is, the smaller the charge volume, the smaller the clearance volume to maintain a constant compression ratio; therefore, the larger the expansion ratio.

It should be noted that without the ability to vary the clearance volume, the delay (or advance) of the intake valve closing to control the charge volume could not be carried out to an extent that would permit complete elimination of throttling at light load. This is because of reduction in the effective compression ratio normally associated with late (or early) intake valve closing. If carried too far, the detrimental effect of reduced effective compression ratio would exceed the benefits of reduced throttling. For example, the compression end temperature would be too low, and the burn rate too slow, resulting in unstable combustion.

In addition to reducing the volume of the trapped intake charge by late or early intake valve closing, the quantity of air to be taken in can also be varied by changing the amount of residual gas in the cylinder. This can be accomplished by varying the timing of the exhaust valve closure. The later the exhaust valve closes, the larger the quantity of residual gas retained in the cylinder, up to a predetermined maximum. Not only does the residual gas reduce the air content of the charge, but it increases its mean temperature, further reducing the mass of the trapped charge. The late exhaust valve closing and the associated increased amount of residuals also contributes to lower nitrogen oxide emissions because the peak combustion temperatures are lower and can eliminate the need for an external exhaust gas recirculating system.

The invention is directed to such a variable cycle engine as described, and more particularly to a method of phaseshifting an engine having multiple intake valves per cylinder for better air flow control.

DESCRIPTION OF THE PRIOR ART

U.S. Ser. No. 07/856,272, Variable Stroke/Clearance Volume Engine, assigned to the assignee of this invention, describes an engine in which the clearance volume and charge volume are changed, and therefore the expansion ratio varies, to enable operation without throttling to reduce engine pumping losses. The air intake is controlled by varying the intake valve opening and closings from a conventional timing cycle. Only one intake valve per cylinder is used.

U.S. Ser. No. 07/856,269, Unthrottled Engine Operation With A Heated Air Cycle, also assigned to the assignee of this invention, describes an engine in which the intake air is unthrottled and preheated with exhaust gas through the use of a heat exchanger. There is no change in the clearance volume/piston stroke, and only one intake valve per cylinder is used.

SAE Report No. 890677, Saunders et al., February, 1989, discusses the value of variable intake valve timing as a load control to eliminate throttling and, therefore, engine pumping losses combined with changes in cylinder clearance volume to increase expansion ratio and vary the compression ratio to compensate for the change caused by the variable valve closing schedule. There is no change in exhaust valve timing and no heating of the intake air or use of exhaust gas to do so. Also, there is no first stage of intake timing retard combined with exhuast timing retard, followed by a second stage of intake timing retard only. The engine uses an Otto cycle at full-load and Atkinson cycle at part-load.

U.S. Pat. No. 4,700,684, Pischinger et al., shows and describes an unthrottled engine operation in which the mass of fresh mixture charge changes with the load, and the load is changed by increasing the amount of exhaust gas in the cylinder in proportion to the load and the volume of oxygen or intake charge desired. Variable control of both the intake and exhaust events is used to assure that the engine cylinder is partially filled with exhaust gas at light loads, with only the remaining portion of the cylinder volume available for the intake air. In this case, mixing the intake air with substantial amounts of exhaust gas, as proposed by Pischinger, increases the mean temperature of the gas in the cylinder and, therefore, avoids a reduction in compression ratio and low compression end temperature, which is normally associated with late or early intake valve closing.

However, it should be noted that the use of substantial amounts of exhaust gas to fill up that part of the cylinder that is not filled with intake charge, while it will heat the intake air in the remaining volume, it will materially affect the ability to achieve combustion and maintain good quality of the subsequent emissions.

In Pischinger, at light-load, at least 50% dilution appears to be required for the method described in the patent. It is well known that diluting the intake charge with large amounts of exhaust gas leads to dramatic increases in the unburned hydrocarbon emissions, and this effect is especially pronounced at low engine speeds.

U.S. Pat. No. 4,138,973, Luria, describes a throttle-less engine with a variable stroke piston, coupled with means to change the intake valve timing to provide an essentially constant compression ratio while operating under both Otto and Atkinson cycles of operation for better engine efficiency. No residual exhaust gases are utilized to increase the compression end temperature and to control the charge volume. Also, only one intake valve is apparent.

U.S. Pat. No. 3,667,433, Isley, merely shows and describes specific apparatuses for varying the engine compression ratio/piston clearance volume.

U.S. Pat. No. 4,552,112, Najao et al. merely shows and describes a valve timing control mechanism for an engine intake system having two intake and two exhaust valves for each cylinder. Rotating blocks 58, 59 in FIG. 2 are actuated to varying the timing of one of the intake valves and one of the exhaust valves relative to the other. There is no description of the engine having a variable stroke, or being a throttle-less operation, to reduce pumping losses, or using residual exhaust gas to control charge volume and compression end temperature.

U.S. Pat. No. 4,917,058, Nelson et al., describes a method of operating a throttle-less engine by varying the timing of the intake valve.

U.S. Pat. No. 4,974,560, King, shows an engine with two intake and two exhaust valves per cylinder, the valves being driven by different camshafts, and specific means to vary or phaseshift the timing of the valve events.

U.S. Pat. No. 4,979,427, Pfeffer et al., like Isley, is directed to specific piston mechanisms for varying the engine stroke/clearance volume.

U.S. Pat. No. 4,993,370, Hashiyama et al., describes and shows a specific phaseshifting mechanism for varying the engine timing events.

None of the above art shows or describes a phaseshifting concept for an engine to operate unthrottled under an auto cycle at full-load and under an Atkinson cycle at part-load, with at least two intake valves per cylinder, an essentially constant effective compression ratio provided by varying the engine/stroke clearance volume, together with phaseshifting the valve timing events to control charge volume, and utilizing residual gases to maintain a desired compression end temperature.

SUMMARY OF THE INVENTION

The invention is directed to a phaseshifting concept or method for a variable cycle engine that utilizes an Otto cycle of operation at full-load and an Atkinson cycle of operation during part-load, the engine having multiple intake valves per cylinder, the ability to vary the piston clearance volume to control intake charge volume and compression ratio, and utilizing late or early intake valve closing, coupled with varying the volume of residual gas in the cylinder to obtain high engine operating efficiency.

More specifically, the intake and exhaust events are retarded as a function of decreased engine load to decrease the charge volume, while at the same time the residual gas content is increased, with the effective compression ratio remaining essentially constant as a result of a change in the clearance volume. The use of two intake valves per cylinder permits in one embodiment to maintain the engine timing of the primary intake valve on the fixed Otto cycle at all times, while varying the advance or retarding of the secondary intake valve as a function of a load, to not only control the intake charge volume but to provide sufficient air flow for proper engine operation.

It is, therefore, a primary object of the invention to provide a method of operating a variable cycle type engine with a phaseshifting concept that permits throttle-less operation for high efficiency by the use of multiple intake valves per cylinder and varying the late or early closing and opening events of the intake and exhaust valves.

In a second embodiment, the timing schedule for opening and closing of the intake events for all intake valves is varied during part-load operation for high operating efficiency and again, throttle-less control.

Other objects, features and advantages of the invention become more apparent upon reference to the succeeding, detailed description thereof, and to the drawings illustrating the preferred embodiments thereof.

As stated previously, the variable cycle engine varies the opening and closing events for the intake and exhaust valves from the conventional Otto cycle of operation, to provide a throttle-less engine operation with high efficiency. FIG. 3 illustrates one embodiment to accomplish the variable intake and exhaust valve timing by phaseshifting the camshafts relative to the crankshaft. Although not shown, the engine in this case would be equipped with separate intake and exhaust camshafts, and each cylinder would have two intake valves, primary and secondary, each with independently adjustable timing.

Figure 3A:
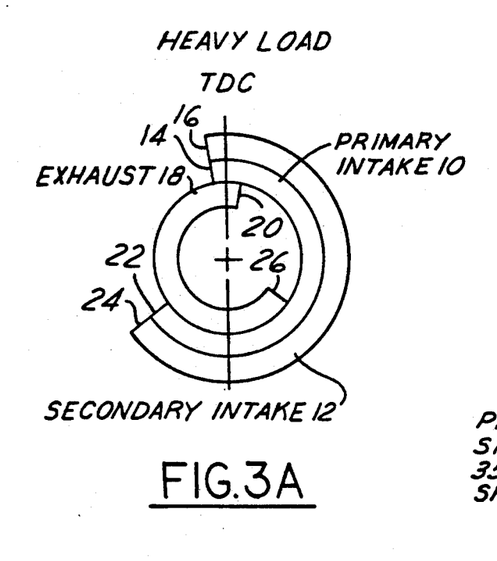
FIGS. 3A, 3B, 3C, and 3D are schematic representations that illustrate schematically and graphically the engine intake and exhaust valve timing schedules for heavy, medium, and light loads, and idle speed operation.

FIG. 3A illustrates how the above timing is effected at heavy load, when the engine operates according to the Otto cycle, which would be a conventional timing diagram without phaseshift. In this case, both the primary intake valve indicated in general at 10 and the secondary intake valve indicated in general at 12 are timed to open at the points 14 and 16 just prior to the indicated top dead center position of the piston. The exhaust valve indicated in general at 18, in the meantime, has a closing at the point 20 just slightly beyond top dead center position so that there is an overlap between all of the valves at this point. This provides for a controlled amount of residual gas to remain in the engine cylinder. The intake valves closing and the exhaust valve opening points at 22, 24, and 26, respectively, follow the conventional Otto cycle timing schedule.

Figure 3B:
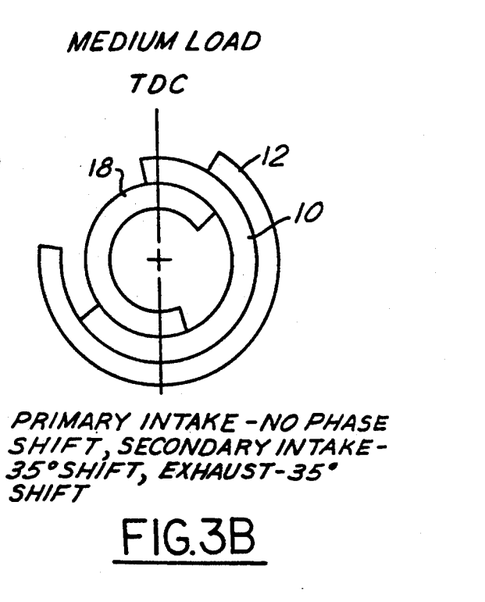

Turning to FIG. 3B, as the engine load decreases to a medium load, for example, both the secondary intake and the exhaust events 12 and 18 are retarded or shifted 35° engine crank angle, as indicated, to delay both the closing of the secondary intake valve and the closing of the exhaust valve, while at the same time maintaining the primary intake valve timing unchanged, as also indicated. This results in a reduced intake charge volume due to late secondary intake valve closing and a dilution of the charge with residual gas due to late exhaust valve closing. The primary intake valve is not retarded in this case so that as the cylinder volume increases after top dead center position, there will still be sufficient flow area to prevent an increase in the pumping work/pumping losses. The phaseshift of one intake valve relative to the other increases the overall duration of the open intake valve event. The amount of phaseshift would be a function of the engine load.

Figure 3C:
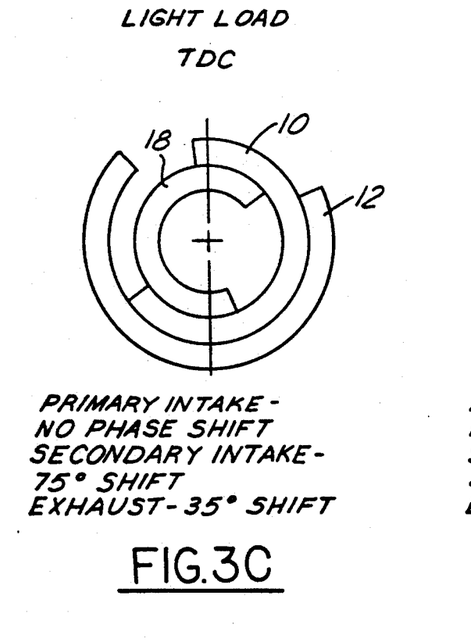

In each engine, there is a limit beyond which the amount of residual gas in the intake charge should not be increased if an acceptable combustion rate is to be maintained. Therefore, as the engine load further decreases, as illustrated in FIG. 3C, for the light load operation, the initial 35° phaseshift of the exhaust valve event 18 is maintained without change, and only the secondary intake valve timing 12 is shifted a further 40° crank angle, for example, to further delay the closing of the secondary intake valve. This reduces the trapped charge volume for the particular load control, while maintaining the exhaust valve at the 35° retarded mark has prevented an increase in the residual gas to maintain it still at an acceptable level for establishing the desired burn rate, etc.

Figure 3D:
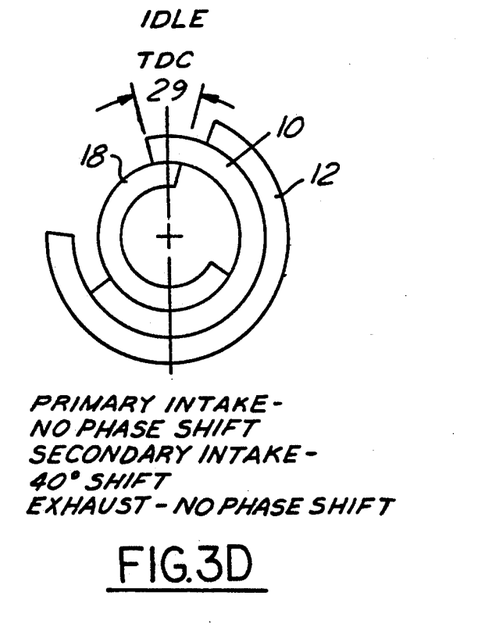

Under idle speed operating conditions indicated in FIG. 3D, the primary concern is to have smooth engine operation. To obtain this, fast burn rates are required. At idle, the exhaust valve timing, therefore, is not phaseshifted and set for a very short valve overlap of the primary and exhaust valve events, as indicated by the angle 29 in FIG. 3D. The timing of the secondary valve intake 12 is returned to a less retarded position of approximately 40° crank angle shift from top dead center position, to reduce the charge volume to an extent consistent with retaining relatively high effective compression ratios. This will give optimal burn rates. The idle speed timing diagram, FIG. 3D, with a return of the exhaust timing events to a conventional timing schedule, therefore corresponds substantially to the Otto cycle timing for heavy load in FIG. 3A, with the exception of the retardation of the secondary intake valve 12.

In operation, therefore, it will be seen that for heavy load operation, the engine utilizes the conventional timing schedule for an Otto cycle engine, and that as the load decreases, as indicated in FIGS. 3B, 3C, and 3D, the secondary intake valve is shifted progressively to decrease the charge volume while the exhaust valve timing is phaseshifted to increase the residual gas content in the cylinder up to a maximum. Beyond that, only the secondary intake valve is retarded to prevent overdilution of the intake charge. At idle, the exhaust event is returned to a conventional timing schedule, and the secondary intake valve only retarded an amount sufficient to provide enough intake charge to maintain the engine at a smooth operating level.

Figure 4A:
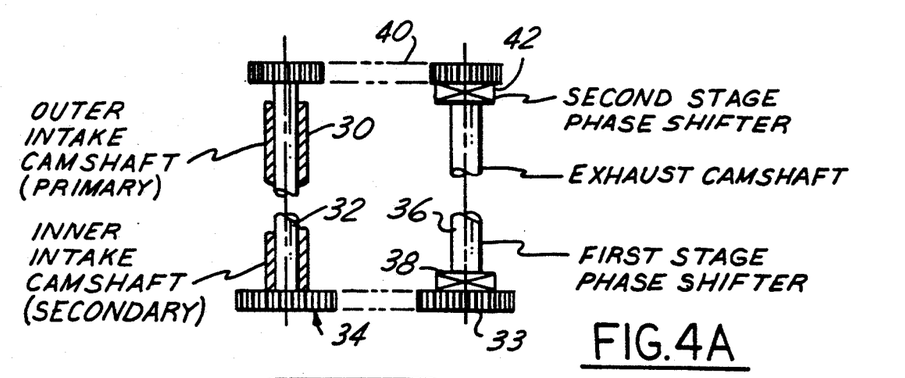
FIG. 4A illustrates schematically, with parts broken away and in section, a plan view of a valve phaseshifting arrangement.
Figure 4B:
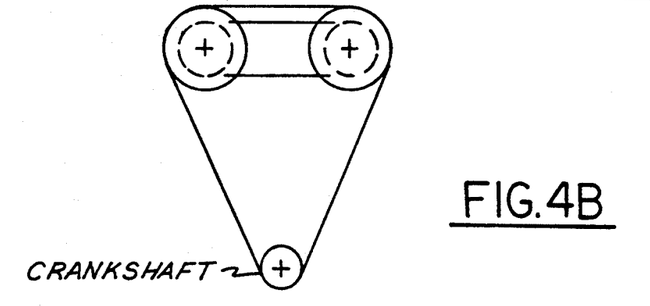
FIG. 4B schematically illustrates an end view of FIG. 4A.

FIG. 4A and 4B illustrate schematically a mechanism for providing independent operation of the various intake and exhaust valves to maintain the timing schedule as depicted in FIG. 3. More specifically, the intake camshaft assembly in this case is made of two coaxial camshafts, an outer tubular one 30 that would carry all of the primary cam lobes, not shown, and an inner one 32 that would carry all of the secondary cam lobes for operating the secondary intake valves. The outer camshaft 30 in this case would be driven directly from the crankshaft sprocket through a timing belt or a chain and camshaft sprocket indicated at 34. The exhaust camshaft 36, on the other hand, would also be driven from the crankshaft but through a a first stage phaseshifter 38 interposed between the camshaft sprocket 33 and the exhaust camshaft 36 itself.

The inner intake valve camshaft 32 in this case is driven from the exhaust camshaft 36 by an additional timing belt or chain drive 40 and a second stage phaseshifter 42. As long as the two phaseshifters 38 and 42 are inactive or inoperative., they will act as a solid transmitting drive device and both the inner and outer camshafts as well as the exhaust camshaft will rotate with the same angular velocity. The timing, therefore, of all of the intake and exhaust valves, would remain fixed and operate according to the Otto cycle timing schedule.

Activation of the first stage phaseshifter 38 allowing relative rotation between the exhaust camshaft 36 and the camshaft sprocket 33 would shift both the exhaust valve camshaft 36 and inner secondary intake valve camshaft 32 relative to the crankshaft. The outer or primary intake valve camshaft 30 would still maintain its same phase relationship to the crankshaft. This corresponds to that shown in FIG. 3B, for the case of medium load. Subsequent activation of the second stage phaseshifter 42 would shift only the inner intake camshaft 32. This would correspond to that shown in FIG. 3C for the case of light load. The case for FIG. 3D is not shown.

FIGS. 5A-D illustrate a second embodiment of the invention in which the primary intake valve camshaft can also be phaseshifted. This is slightly different than that shown in the FIG. 3 concept. In this case, the heavy load and idle timing schedules remain the same as shown in FIGS. 3A and 3D. However, for decreasing loads, both the primary intake valve 10 and the secondary intake valve 12, as well as the exhaust valve 18, are phaseshifted relative to the crankshaft during the medium load stage. The light load stage, as before in FIG. 3C, involves only a further or additional phaseshift of the inner intake valve 12. This concept requires less phaseshift range of the coaxial intake camshaft.

Figures 5A, 5B:
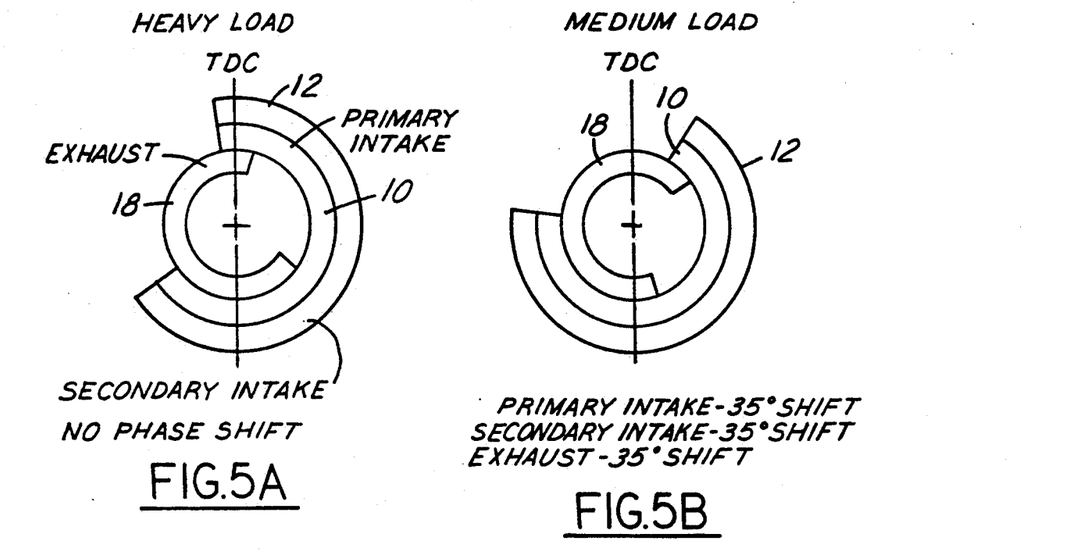
FIGS. 5A, 5B, 5C, and 5D illustrate graphically and schematically the engine intake and exhaust valve timing events of a second embodiment at heavy, medium, and light loads, and idle speed condition of operation.
Figures 5C, 5D:
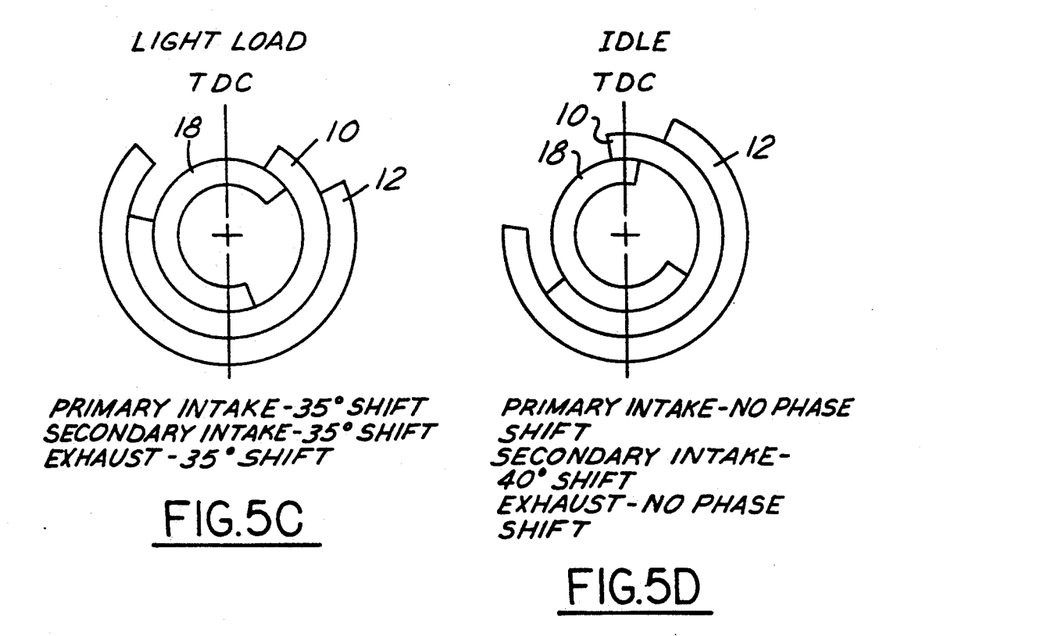
Figure 6A:
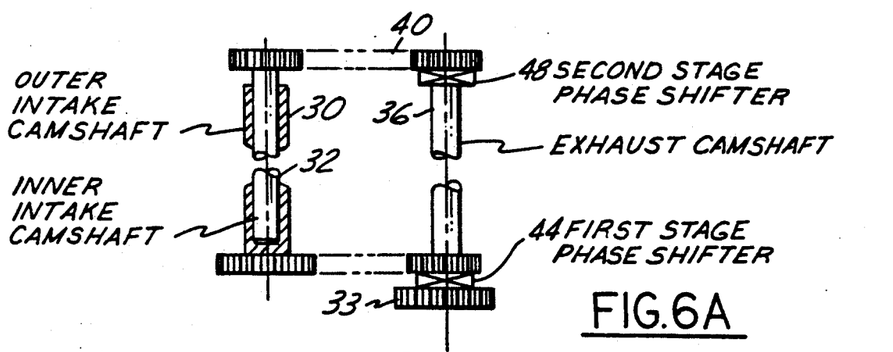
FIGS. 6A and 6B are similar to those of FIGS. 4A and 4B, illustrating a second embodiment of the invention.
Figure 6B:
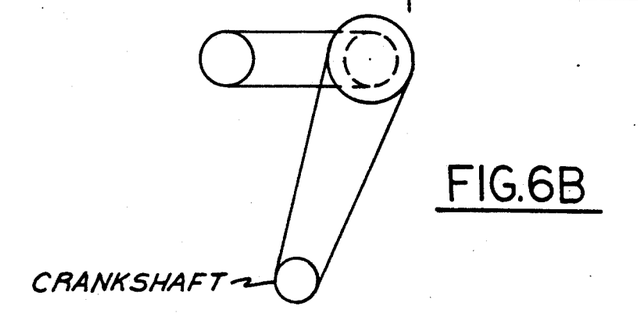

FIGS. 6A and B show how the strategy of FIG. 5 can be implemented. The exhaust camshaft 36, in this case, is driven from the camshaft sprocket 33 through a first stage phaseshifter 44. The outer intake valve camshaft 30 is driven directly from the exhaust camshaft 36, while the inner intake camshaft 32 is driven through a chain or belt drive 46 and a second stage phaseshifter 48 at the other end of exhaust camshaft 36.

It should be noted that both the intake and exhaust camshafts could be made as coaxial shaft assemblies, thus achieving variable event timing and duration in both. The clearance volume would be varied, as illustrated in FIG. 1 concurrently with changes in the trapped intake charge volume and the amount of retained residual gas. Varying the clearance volume during engine operation also could be done in a variety of ways known in the prior art and, therefore, are not discussed herein.

From the foregoing, it will be sen that the invention provides a concept or method of operating an engine with multiple intake valves per cylinder with a phaseshifting strategy that permits operation without throttling of the intake air, the intake charge volume and compression and temperature being controlled by varying the piston stroke/clearance volume and retarding or delaying the opening and closing events of the intake and exhaust valves selectively to maintain an effectively constant compression ratio while increasing the expansion ratio to provide a highly efficient operation.

While the invention has been shown and described in its preferred embodiments, it will be clear to those skilled in the arts to which it pertains that many changes in modifications may be made thereto without departing from the scope of the invention.

We claim:

1. In an internal combustion engine having multiple valves per cylinder including primary and secondary intake valves and an exhaust valve, a method of operating the engine on an Otto cycle engine timing during full load operation and an Atkinson cycle engine timing during part load operation, to improve the fuel efficiency of the engine while controlling the nitrogen oxide emissions, comprising the steps of:

operating the engine with unthrottled air intake to eliminate engine pumping losses, operating the multiple intake and exhaust valve opening and closing events on a conventional Otto cycle schedule at full load, and operating the engine under the Atkinson cycle at part load by varying the timing of the primary and the secondary intake valve events independently of each other to control the intake charge volume and to assure that the engine effective expansion ratio is significantly higher than the effective compression ratio, and by independently varying the timing of the exhaust valve event to control the amount of residual gas, and by varying the cylinder clearance volume to maintain adequately high effective compression ratio.

2. A method as in claim 1, including the step of maintaining the fixed timing schedule of opening and closing of the primary intake valve while varying the engine piston stroke/clearance volume and retarding the secondary intake event and the exhaust event as a function of the decrease in load to reduce the intake charge volume and dilute the intake charge with residual gases while maintaining an essentially constant effective compression ratio and increasing the expansion ratio.

3. A method as in claim 1, wherein during medium load operation, while maintaining the fixed timing schedule of opening and closing of the primary intake valve, phaseshifting both the secondary intake valve closing and the exhaust valve closing to retard the events in comparison to heavy load operation to decrease the intake charge volume through the retard of the secondary intake valve timing while concurrently increasing the residual gas volume in the engine cylinder by providing an increased overlap between the primary intake valve opening and the exhaust valve closing, and reducing the cylinder clearance volume to retain adequate effective compression ratio and to increase the expansion ratio.

4. A method as in claim 3, wherein during light load operation, while maintaining both the fixed timing schedule of opening and closing of the primary intake valve for heavy loads and the retarded timing of the exhaust valve closing during medium load operation, further retarding the timing of the secondary intake valve closing to further reduce the intake charge volume while eliminating an overlap between the secondary intake valve opening and exhaust valve closing to maintain the volume of residual gases in the charge at an acceptable combustion rate, and further reducing the cylinder clearance volume to maintain adequate effective compression ratio and further increase the effective expansion ratio.

5. A method as in claim 4, wherein between heavy and medium load operations, a variable overlap is provided between the opening of both the primary and secondary intake valves and the closing of the exhaust valve for variable control of the volume of residual gases in the charge.

6. In an internal combustion engine having multiple intake and exhaust valves per cylinder and multiple camshafts for actuating the valves including primary and secondary intake valves and primary and secondary intake camshafts, a method of operating the engine on the Otto cycle engine timing during full load operation and the Atkinson cycle engine timing during part load operation, to improve the fuel efficiency of the engine while controlling the nitrogen oxide emissions, comprising the steps of:
operating the engine with unthrottled air intake to eliminate engine pumping losses,
operating the multiple intake and exhaust valve opening and closing events in a first stage of operation on a conventional Otto cycle schedule at full load, and as the load decreases,
operating the engine in a second stage of operation on an Atkinson cycle by varying the engine piston stroke/clearance volume and variably retarding the secondary intake and the exhaust valve events as a function of the load without changing the timing of the primary intake valve openings and closings to thereby variably reduce the intake charge volume and control the increase in the residual gas content in the cylinder to control dilution of the charge as a function of the load, while maintaining adequate effective compression ratio and increased effective expansion ratio.

7. A method as in claim 6, wherein the further retarding of the exhaust events is terminated below a predetermined level of the load to maintain the residual gas quantity within a desired range.

8. A method as in claim 6, including providing the engine with separate intake and exhaust camshafts, each intake camshaft consisting of a pair of coaxial shafts, one coaxial shaft carrying cam lobes for actuating the primary intake valves and being driven by the engine crankshaft, the remaining coaxial intake camshaft carrying the lobes for actuating the secondary intake valves and being operatively connected to and driven by the crankshaft driven exhaust camshaft, and further providing a first phaseshifter mechanism between the exhaust camshaft and the crankshaft and a second phaseshifter mechanism between the exhaust camshaft and the remaining coaxial shaft, the phaseshifters when inoperative effecting timing of the intake and exhaust events according to the first stage Otto timing cycle, activation of the first phaseshifter effecting operation of the engine on the Atkinson timing cycle to phaseshift the timing to provide the second stage engine load operating conditions, activation of the second phaseshifter effecting a phaseshifting of the timing to provide the third stage engine load operating conditions.

9. A method as in claim 6, including providing the engine with separate intake and exhaust camshafts, each intake camshaft consisting of a pair of coaxial shafts, one coaxial shaft carrying cam lobes for actuating the primary intake valves and being driven directly by the crankshaft, the remaining coaxial intake camshaft carrying the lobes for actuating the secondary intake valves and being connected to and driven indirectly by the crankshaft driven exhaust camshaft, and further providing a first phaseshifter mechanism between the exhaust camshaft and the crankshaft and a second phaseshifter mechanism between the exhaust camshaft and the remaining coaxial shaft, the phaseshifters when inoperative effecting timing of the intake and exhaust events according to the first stage fixed Otto timing cycle, activation of the first phaseshifter effecting operation of the engine on the Atkinson timing cycle to phaseshift the timing to provide the second stage engine load operating conditions, activation of the second phaseshifter effecting a phaseshifting of the timing to provide the third stage engine load operating conditions.

10. A method as in claim 7, wherein during engine idle speed conditions, only the secondary intake valve events are retarded with respect to the conventional Otto cycle engine operation of the intake and exhaust events thereby providing a lessened overlap between the intake and the exhaust valve events to both reduce the trapped charge volume and to minimize the volume of residual gas in the engine.

11. In an internal combustion engine having multiple intake and exhaust valves per cylinder including primary and secondary intake valves, a method of operating the engine on the Otto cycle engine timing during full load operation and the Atkinson cycle engine timing during part load operation, to improve the fuel efficiency of the engine while controlling the nitrogen oxide emissions, comprising the steps of:
operating the engine with unthrottled air intake to eliminate engine pumping losses,
operating the multiple intake and exhaust valve opening and closing events in a first stage of operation at full load on a conventional Otto cycle schedule, and as the load decreases,
operating the engine in a second stage of operation on an Atkinson cycle by varying the engine piston stroke/clearance volume and variably retarding the primary and secondary intake and exhaust valve events as a function of the load to thereby variably reduce the intake charge volume and control the increase in the residual gas content in the cylinder to control dilution of the charge as a function of the load, while maintaining adequate effective compression ratio and increased effective expansion ratio.

12. A method as in claim 11, wherein during engine light load conditions, the secondary intake valve events in a third stage of operation are further retarded with respect to the primary intake and exhaust events thereby providing a lessened overlap between the intake and the exhaust valve events to both reduce the trapped charge volume and to control the quantity of residual gas in the engine.

13. A method as in claim 12, wherein during engine idle conditions, only the secondary intake valve events are retarded with respect to the conventional Otto cycle engine timing operation of the intake and exhaust events thereby providing a lessened overlap between the intake and exhaust valve events to both reduce the trapped charge volume and to minimize the quantity of residual gas in the engine.

14. A method as in claim 11, including providing the engine with separate intake and exhaust camshafts, each intake camshaft consisting of a pair of coaxial shafts, one coaxial shaft carrying cam lobes for actuating the primary intake valves and being driven directly by the crankshaft driven exhaust camshaft, the remaining coaxial intake camshaft carrying the lobes for actuating the secondary intake valves and being connected to and driven indirectly by the crankshaft driven exhaust camshaft, and phaseshifter mechanisms operatively located between the coaxial intake and exhaust camshafts and crankshaft, the phaseshifters when inoperative effecting timing of the intake and exhaust events according to a first stage fixed Otto timing cycle, operativeness of the phaseshifters effecting operation of the engine on the Atkinson timing cycle to phaseshift the timing to provide second and third stages of engine load operating conditions.

15. A method as in claim 11, including providing the engine with separate intake and exhaust camshafts, each intake camshaft consisting of a pair of coaxial shafts, one coaxial shaft carrying cam lobes for actuating the primary intake valves and being driven directly by the crankshaft driven exhaust camshaft, the remaining coaxial intake camshaft carrying the lobes for actuating the secondary intake valves and being connected to and driven indirectly by the crankshaft driven exhaust camshaft, and further providing a first phaseshifter mechanism between the exhaust camshaft and the crankshaft and a second phaseshifter mechanism between the exhaust camshaft and the remaining coaxial shaft, the phaseshifters when inoperative effecting timing of the intake and exhaust events according to the first stage fixed Otto timing cycle, activation of the first phaseshifter effecting operation of the engine on the Atkinson timing cycle to phaseshift the timing to provide the second stage engine load operating conditions, activation of the second phaseshifter effecting a phaseshifting of the timing to provide the third stage engine load operating conditions.

* * * * *